United States Patent Office 3,457,269
Patented July 22, 1969

3,457,269
N-SUBSTITUTED PHENYL AND N-SUBSTITUTED PHENYLALKYL 3 - INDAZOLECARBOXAMIDES AND PREPARATION THEREOF
Frederick K. Kirchner, Bethlehem, N.Y., assignor to Sterling Drug Inc., New York, N.Y. a corporation of Delaware
No Drawing. Continuation-in-part of application Ser. No. 160,662, Dec. 19, 1961. This application Feb. 24, 1967, Ser. No. 618,322
Int. Cl. C07d 49/10, 49/18; A61k 27/00
U.S. Cl. 260—295         13 Claims

ABSTRACT OF THE DISCLOSURE

N-substituted phenyl and N-substituted phenylalkyl 3-indazolecarboxamides are prepared from diindazolo[2,3-a,2′,3′-d]-pyrazine-7,14-dione and the appropriate amines. They have useful pharmacological properties, e.g., as hypotensive agents.

---

This application is a continuation-in-part of copending application, Ser. No. 160,662, filed Dec. 19, 1961, now abandoned.

This invention relates to amides.

The distinctive feature of the invention is the affording of a new class of compounds wherein a 3-indazole-carbonyl group is joined through an —NH— bridge to the known types of aryl, aralkyl, heteryl or heterylalkyl groups.

The compounds of the invention are compounds of the generalized formula W—CONH(CH$_2$)$_n$R, wherein W is a 3-indazole moiety, $n$ is a number from 0 to 3, and R is a member selected from the group consisting of phenyl, phenyl substituted by from one to three members of the group consisting of lower-alkyl, lower-alkoxy, lower-alkylmercapto, lower - alkylsulfinyl, lower - alkylsulfonyl, halo, nitro, and trihalomethyl and pyridyl.

The symbol W as used herein, is an unsubstituted indazole or an indazole group substituted in the benzene ring by one or more substituents inert to the reaction conditions and reagents used in the process for preparing the compounds. Such inert substituents include, without limitation, lower-alkyl, lower-alkoxy, lower-alkylmercapto, lower-alkylsulfinyl, lower-alkylsulfonyl, halogen, nitro, dialkylamino and trifluoromethyl groups; as well as additional hydrogen atoms, in which latter case the corresponding tetrahydro compounds result; and, the 3-indazole- group can also include a lower-aliphatic hydrocarbon, monocarbocyclic aryl substituted lower-aliphatic hydrocarbon or monocarbocyclic aryl substituent on either of the nitrogen atoms of the pyrazole ring.

A particular aspect of the invention relates to amides having the formula

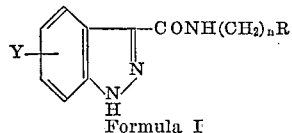

Formula I wherein Y is a member of the group consisting of lower-alkoxy, lower-alkylmercapto, lower-alkylsulfinyl, lower-alkylsulfonyl, nitro, halogen, trifluoromethyl, and amino; $n$ is a number from 0 to 3; and R is a member selected from the group consisting of phenyl, phenyl substituted by from one to three members of the group consisting of lower-alkyl, lower-alkoxy, lower-alkylmercapto, lower-alkylsulfinyl, lower-alkylsulfonyl, halo, nitro, and trihalomethyl and pyridyl and to amides having the formula

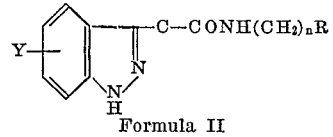

Formula II wherein Y is a member of the group consisting of hydrogen, lower-alkyl, lower-alkoxy, lower-alkylmercapto, lower-alkylsulfinyl, lower-alkylsulfonyl, nitro, halogen, trifluoromethyl, and amino; $n$ is a number from 0 to 3; and R is a member selected from the group consisting of phenyl substituted by from one to three members of the group consisting of lower-alkoxy, lower-alkylmercapto, lower-alkylsulfinyl, lower-alkylsulfonyl, halo, nitro and trihalomethyl and pyridyl.

In the above formulas the Y substituent when lower-alkyl, lower-alkoxy, lower-alkylmercapto, lower-alkylsulfinyl and lower-alkylsulfonyl radicals has preferably from one to about six carbon atoms, thus including such radicals as methyl, ethyl, propyl, isopropyl, butyl, sec.-butyl, pentyl, hexyl and the like for lower-alkyl; methylmercapto, ethylmercapto, isopropylmercapto, n-hexylmercapto and the like for lower-alkylmercapto, methylsulfinyl, ethyl sulfinyl, propylsulfinyl, pentylsulfinyl, and the like for lower-alkylsulfinyl; methylsulfonyl, ethylsulfonyl, n-butylsulfonyl and the like for lower-alkylsulfonyl; and methoxy, ethoxy, propoxy, butoxy, isobutoxy, pentoxy, hexoxy and the like for lower-alkoxy. The Y substituent when halogen can be any of the halogens fluorine, chlorine, bromine or iodine.

When R in the above general formulas is phenyl substituted by from one to three lower-alkyl, lower-alkoxy, lower-alkylmercapto, lower-alkylsulfinyl, lower-alkylsulfonyl or halogen groups the halogen can be fluorine, chlorine, bromine or iodine and the lower-alkyl, lower-alkoxy, lower-alkylmercapto, lower-alkylsulfinyl, and lower-alkylsulfonyl groups can contain from one to about six carbon atoms including, for example methyl, ethyl, propyl, isopropyl, butyl, isobutyl, tertiary-butyl, pentyl, isopentyl, hexyl, isohexyl and the like for lower-alkyl; methoxy, ethoxy, propoxy, isopropoxy, butoxy, tert.-butoxy, pentoxy, isopentoxy, hexoxy, etc. for lower-alkoxy; methylmercapto, ethylmercapto, propylmercapto, butylmercapto, isohexylmercapto for lower-alkylmercapto; methylsulfinyl, ethylsulfinyl, isopropylsulfinyl, sec.-butylsulfinyl, pentylsulfinyl and hexylsulfinyl for lower alkylsulfinyl; and methylsulfonyl, ethylsulfonyl, propylsulfonyl, butylsulfonyl, pentylsulfony, hexylsulfonyl and the like for lower-alkylsulfonyl. The halogen, lower-alkyl, lower-alkoxy, lower-alkylmercapto, lower-alkylsulfinyl and lower-alkylsulfonyl groups can be present on any of the positions on the phenyl nucleus, and where more than one, can be the same or different and can be in any of the various position combinations relative to each other as, for example, 4-iodophenyl, 2-fluorophenyl, 3-n-butylphenyl, 3-isohexoxyphenyl, 4-propylmercaptophenyl, 2-methylsulfinylphenyl, 2 - pentylsulfonylphenyl, 2,4 - difluorophenyl, 2,4,6-tribromophenyl, 2,6-dimethylphenyl, 3,4 - dipropoxyphenyl, 3-chloro-4-methylmercaptophenyl, 3-bromo-5-methylphenyl, 3,5-dibromo-4-butylphenyl and the like.

The R in the above general formulas when pyridyl can be 2-pyridyl, 3-pyridyl or 4-pyridyl.

The grouping (CH$_2$)$_n$, where $n$ is a number from 1 to 3 is a lower-alkylene bridge between the group R and the amido nitrogen atom and includes for example, methylene, —CH$_2$—, ethylene, —CH$_2$CH$_2$—, trimethylene, —CH$_2$CH$_2$CH$_2$—, and propylene, —CH(CH$_3$)CH$_2$—. When $n$ is 0 there are no carbon atoms intervening between the group R and the amido nitrogen which in this case are directly joined.

The compounds of the invention are produced by several different methods. The procedure of general applicability consists of interacting an aryl-, aralkyl-, pyridyl- or pyridylalkylamine having the formula R(CH$_2$)$_n$NH$_2$ wherein R and $n$ have the meanings given above with the known diindazolo[2,3-a,2',3'-d]pyrazine-7,14-dione having the formula

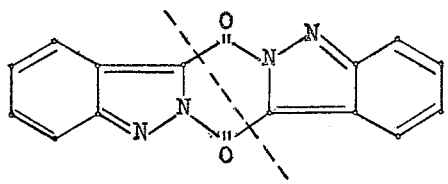

or its BZ-substituted derivatives and which acts as an acylating agent by virtue of the rupture of bonds indicated by the dotted lines in the above formula. The reaction is carried out under anhydrous conditions in an inert solvent as for example, benzene, toluene, xylene, chloroform, carbon tetrachloride or the like, and takes place at temperatures between about 50° C. and about 150° C., and the best mode for carrying out the reaction consists of selecting a solvent that boils in this range and conducting the reaction at the reflux temperature.

The diketopiperazine derivatives of indazole illustrated by the formula above are produced by the action of thionyl chloride on an appropriate indazole-3-carboxylic acid whereby, in effect, a molecule of water is removed from each of two indazole molecules which then condense with each other.

Another method for preparing the compounds of the invention comprises reacting an appropriately substituted lower-alkyl 3-indazolecarboxylate with the appropriate primary amine under conditions conventionally employed for amidation of carboxylic acids and their derivatives.

The intermediate substituted lower-alkyl 3-indazolecarboxylates are a known class of compounds which can be prepared either by treatment of selected hydrazones of lower-alkyl o-nitrophenylglyoxylates with alkali or from isatin and its derivatives.

The compounds of the invention were found to be hypotensive agents. Thus, when tested in bilaterally encapsulated renal hypertensive rats having an elevated systolic blood pressure ranging between 162 and 193, they produce a reduction in systolic blood pressure ranging from 12 to 40 mm. of mercury. Illustrative of the results obtained were for example the following: N-(4-methylmercaptophenyl)-3-indazolecarboxamide, 20 and 10 mm. Hg at 1.25 and 5 mg./kg. respectively; N-phenyl-3-indazolecarboxamide, 22.7 mm. Hg. at 10 mg./kg.; N-(2-chlorophenyl)-3-indazolecarboxamide, 14.7, 43.3, 32 mm. Hg at 1.25, 5 and 10 mg./kg. respectively; and N-(2,4-dichlorophenyl)-3-indazolecarboxamide, 24.7 and 26.7 mm. Hg at 1.25 and 5 mg./kg. respectively.

The structures of the compounds of this invention followed from the methods of synthesis which were used and from the elementary analyses of the products obtained.

The invention is illustrated by the following examples without, however, being limited thereto.

EXAMPLE 1

N-(2-chlorophenyl)-3-indazolecarboxamide

A mixture of 4 g. of diiandozolo[2,3-a,2',3'-d]pyrazine-7,14-dione and 8 g. of 2-chloroaniline was heated until solution was complete. The solution was cooled to cause the separation of a solid which was collected by suction filtration. Recrystallization from aqueous pyridine gave 5.4 g. of N-(2-chlorophenyl)-3-indazolecarboxamide, M.P. 269–270° C. (corr.).

*Analysis.*—Calcd. for C$_{14}$H$_{10}$ClN$_3$O: C, 61.88; H, 3.71; Cl, 13.05. Found: C, 62.05; H, 3.82; Cl, 13.24.

EXAMPLE 2

N-(2-chlorobenzyl)-3-indazolecarboxamide

A mixture of 14.4 g. of diindazolo[2,3-a,2',3'-d]-pyrazine-7,14-dione and 14.2 g. of 2-chlorobenzylamine in 150 ml. of benzene was refluxed for one hour. The solid which precipitated was collected by filtration then dissolved in 750 ml. of acetone. The residual solid was collected by filtration and discarded and the filtrate evaporated under reduced pressure. The cream colored solid thus obtained was recrystallized from acetone to give 8.2 g. of N(2-chlorobenzyl)-3-indazolecarboxamide, M.P. 210–211° C. (corr.).

*Analysis.*—Calcd. for C$_{15}$H$_{12}$ClN$_3$O: Cl, 12.41; N, 14.71. Found: Cl, 12.46; N, 14.87.

EXAMPLE 3

N-(2-phenylethyl)-4,5,6,7-tetrahydroindazole-3-carboxamide

A suspension of 10 g. of 4,5,6,7-tetrahydroindazole-3-carboxylic acid, 50 ml. of thionyl chloride and 5 drops of dimethylformamide was refluxed for five hours then allowed to evaporate at atmospheric pressure. The residue was taken up in benzene and again evaporated to a solid residue. To the residue was added 12 g. of phenylethylamine and 5 ml. of pyridine and the mixture heated until a clear solution was obtained. The mixture was cooled, 150 ml. of sodium bicarbonate solution added and the solid which precipitated collected by filtration. Recrystallization from aqueous ethanol gave 11.5 g. of N-(2-phenylethyl) - 4,5,6,7 - tetrahydroindazole-3-carboxamide, M.P. 173–174° C. (corr.).

*Analysis.*—Calcd. for C$_{16}$H$_{19}$N$_3$O: C, 71.35; H, 7.11; N, 15.60. Found: C, 71.46; H, 7.33; N, 15.93.

N - (4 - methylmercaptophenyl) - 3 - indazolecarboxamide. M.P. 205–207° C. (corr.), by reacting diindazolo [2,3-a,2',3'-d]-pyrazine-7,14-dione with 4-methylmercaptoaniline.

N-(2,4-dichlorophenyl) - 3 - indazolecarboxamide, M.P. 291–295° C. (corr.), by reacting diindazolo[2,3-a,2',3'-d] pyrazine-7,14-dione with 2,4-dichloroaniline.

N-phenyl-3-indazolecarboxamide, M.P. 197–200° C. (corr.), by reacting diindazolo[2,3-a,2',3'-d]pyrazine-7,14-dione with aniline.

N-(4-chlorophenyl)-3-indazolecarboxamide, M.P. 275–276° C. (corr.), by reacting diindazolo[3,3-a,2',3'-d] pyrazine-7,14-dione with 4-chloroaniline.

N-(3-chlorophenyl)-3-indazolecarboxamide, M.P. 214–215° C. (corr.), by reacting diindazolo [2,3-a,2',3'-d] pyrazine-7,14-dione with 3-chloroaniline.

N-(3,4-dichlorophenyl) - 3 - indazolecarboxamide, M.P. 275–276° C. (corr.), by reacting diindazolo[2,3-a,2',3'-d] pyrazine-7,14-dione with 3,4-dichloroaniline.

N-(2-methylphenyl)-3-indazolecarboxamide, M.P. 209–210° C. (corr.), by reacting diindazolo[2,3-a,2',3'-d]pyrazine-7,14-dione with o-toluidine.

N-(2-methoxyphenyl) - 3 - indazolecarboxamide, M.P. 239–240° C. (corr.), by reacting diindazolo[2,3-a,2',3'-d] pyrazine-7,14-dione with o-anisidine.

N - (3,4-dimethoxyphenylethyl) - 4,5,6,7 - tetrahydroindazole-3-carboxamide, M.P. 173–175° C. (corr.), by reacting 4,5,6,7-tetrahydroindazole-3-carboxylic acid with thionyl chloride and 3,4-dimethoxyphenylethylamine.

N-(4-ethoxyphenyl)-2-methyl - 3 - indazolecarboxamide, M.P. 163–165° C. (corr.), by reacting 2-methyl-3-indazolecarbonyl chloride with p-phenetidine.

N-(2-phenylethyl)-3-indazolecarboxamide, M.P. 153–155° C. (corr.), by reacting diindazolo[2,3-a,2',3' - d] pyrazine-7,14-dione with phenylethylamine.

N-(3,4-dimethoxyphenylethyl) - 3 - indazolecarboxamide, M.P. 160–161° C. (corr.), by reacting diindazolo-

[2,3-a,2',3'-d]-pyrazine-7,14-dione with 3,4 - dimethoxyphenylethylamine.

N-(2-pyridylmethyl) - 3 - indazolecarboxamide, M.P. 170–175° C. (corr.), by reacting diindazolo[2,3-a,2',3'-d]pyrazine-7,14-dione with 2-pyridylmethylamine.

N-(3-pyridylmethyl) - 3 - indazolecarboxamide, M.P. 181–184° C. (corr.), by reacting diindazolo[2,3-a,2',3'-d]pyrazine-7,14-dione with 3-pyridylmethylamine.

N-(4-pyridylmethyl) - 3 - indazolecarboxamide, M.P. 171–188° C. (corr.), by reacting diindazolo[2,3-a,2'3'-d]pyrazine-7,14-dione with 4-pyridylmethylamine.

N - (2 - chlorophenyl)-5-methoxy-3-indazolecarboxamide, M.P. 255–256° C. (corr.), by reacting 2,9-dimethoxydiindazolo[2,3,-a,2',3'-d]pyrazine - 7,14 - dione, M.P. >310° C., with 2-chloroaniline.

N-(2-phenylethyl)-5-methoxy - 3 - indazolecarboxamide, M.P. 199–201° C. (corr.), by reacting 2,9-dimethoxydiindazolo[2,3-a,2',3'-d]pyrazine - 7,14-dione with 2-phenylethylamine.

Following the general procedures described above, other amides of 3-indazolecarboxylic acids which can be prepared include for example, N-(2,4,6-tribromophenyl)-5-nitro-3-indazolecarboxamide by reacting ethyl 5-nitro-indazolecarboxylate with 2,4,6-tribromoaniline; N-[3-(4'-trifluoromethylphenyl)propyl] - 4 - bromo - 3 - indazolecarboxamide by reacting methyl 4-bromo-3-indazolecarboxylate with 3-(4'-trifluoromethylphenyl)propylamine; N - (3,4 - dimethoxyphenylethyl)-3-indazolecarboxamide by reacting diindazolo[2,3-a,2',3'-d]pyrazine-7,14-dione with 3,4-dimethoxyphenylethylamine; N-(2,3-diethylsulfonylphenyl)-5-methoxy-3-indazolecarboxamide by reacting 2,9 - dimethoxydiindazolo[2,3-a,2'3'-d]pyrazine-7,14-dione with 2,3-diethylsulfonylaniline; N-(4-sulfinylphenyl)-6-trifluoromethyl-3-indazolecarboxamide by reacting 3,10 - di(trifluoromethyl)diindazolo[2,3,-a,2',3' - d]pyrazine-7,14-dione with 4-sulfinylaniline; N - (3 - chloro-4-methylmercaptophenyl)-5-amino - 3-indazolecarboxamide by reacting methyl 5-amino-3-indazolecarboxylate with 3-chloro -4- methylmercaptoaniline; N-[3'-(2,6-dimethylphenyl)propyl] - 5 - nitro - 3 - indazolecarboxamide by reacting ethyl 5-nitro-3-indazolecarboxylate with 3-(2,6-dimethylphenyl)propylamine; N - [3'-(2-pyridyl)propyl]-3-indazolecarboxamide by reacting diindazolo[2,3-a,2',3'-d]pyrazine - 7,14-dione with 3-(2-pyridyl)propylamine; N - (3,5-diiodophenyl) - 5 - methylsulfonyl-3-indazolecarboxamide by reacting 2,9-dimethylsulfonyldiindazolo[2,3-a,2',3'-d]pyrazine-7,14-dione with 3,5-diiodoaniline; N-(3,5-di-tertiarybutylphenyl)-7-fluoro-3 - indazolecarboxamide by reacting 4,11-difluorodiindazole[2,3-a,2',3'-d]pyrazine-7,14-dione with 3,5-di-(tertiarybutyl)aniline; N - [2' - (3-nitrophenyl)ethyl] - 7 - ethylmercapto - 3 - indazolecarboxamide by reacting methyl 7-ethylmercapto - 3 - indazolecarboxylate with 2-(3-nitrophenyl)ethylamine; N-[2-(2-pyridyl)ethyl] - 5 - methylsulfinyl - 3 - indazolecarboxamide by reacting ethyl 5-methylsulfinyl - 3 - indazolecarboxylate with 2-(2-pyridyl)ethylamine; N - (3,5 - trifluoromethylbenzyl) - 5 - propoxy - 3 - indazolecarboxamide by reacting ethyl 5-propoxy - 3 - indazolecarboxylate with 3,5 - trifluoromethylbenzylamine; N-[3'-(3,4-dimethoxyphenyl)propyl]-6-C1-3-indazolecarboxamide by reacting 3,1-dichlorodiindazolo[2,3-a,2',3'-d]pyrazine - 7,14-dione with 3-(3,4-dimethoxyphenyl)propylamine; N-(2,4,6-trimethylphenyl)-5-methylsulfinyl-3 - indazolecarboxamide by reacting 2,9-dimethylsulfinyldiindazolo[2,3-a,2',3'-d]pyrazine-7,14-dione with 2,4,6-trimethylaniline; N-(4-pyridylmethyl)-4-hexyloxy-3-indazolecarboxamide by reacting ethyl 4-hexyloxy-3-indazolecarboxylate with 4-pyridylmethylamine; N-[2'-(3,4,5-trimethoxyphenyl)ethyl]-6-ethyl-3-indazolecarboxamide by reacting 3,10 - diethyldiindazolo[2,3-a,2',3'-d]pyrazine-7,14 - dione with 2-(3,4,5-trimethoxyphenyl)ethylamine; and N-[2-(4-ethylsulfonylphenyl)ethyl]-3-indazolecarboxide by reacting diindazolo[2,3-a,2'3'-d]pyrazine-7,14-dione with 2-(4-ethylsulfonylphenyl)ethylamine.

I claim:
1. A compound of the formula

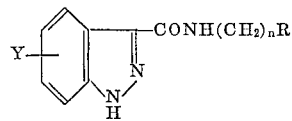

wherein Y is a member of the group consisting of lower-alkoxy, lower-alkylmercapto, lower-alkylsulfinyl, lower-alkylsulfonyl, nitro, halogen, trifluoromethyl, and amino; n is a number from 0 to 3; and R is a member selected from the group consisting of phenyl, phenyl substituted by from one to three members of the group consisting of lower-alkyl, lower-alkoxy, lower-alkylmercapto, lower-alkylsulfinyl, lower-alkylsulfonyl, halo, nitro, and trihalomethyl and pyridyl.

2. A compound of the formula

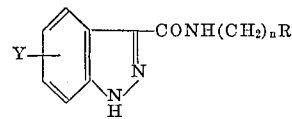

wherein Y is a member of the group consisting of hydrogen, lower-alkyl, lower-alkoxy, lower-alkylmercapto, lower-alkylsulfinyl, lower-alkylsulfonyl, nitro, halogen, trifluoromethyl, and amino; n is a number from 0 to 3; and R is a member selected from the group consisting of phenyl substituted by from one to three members of the group consisting of lower-alkoxy, lower-alkylmercapto, lower-alkylsulfinyl, lower-alkylsulfonyl, halo, nitro, and trihalomethyl and pyridyl.

3. N-(4-methylmercaptophenyl) - 3 - indazolecarboxamide, in accordance with claim 2, wherein Y is hydrogen, n is 0, and R is 4-methylmercaptophenyl.

4. N-phenyl-3-indazolecarboxamide.

5. N-(2-chlorophenyl)-3-indazolecarboxamide, in accordance with claim 2, wherein Y is hydrogen, n is 0, and R is 2-chlorophenyl.

6. N-(2,4-dichlorophenyl)-3-indazolecarboxamide, in accordance with claim 2, wherein Y is hydrogen, n is 0, and R is 2,4-dichlorophenyl.

7. N-(2-chlorobenzyl)-3-indazolecarboxamide, in accordance with claim 2, wherein Y is hydrogen, n is 1, and R is 2-chlorophenyl.

8. N-(2-phenylethyl)-4,5,6,7-tetrahydroindazole-3-carboxamide.

9. N - (4-ethoxyphenyl) - 2 - methyl - 3 - indazolecarboxamide.

10. N-(4-pyridylmethyl)-3-indazolecarboxamide, in accordance with claim 2, wherein Y is hydrogen, n is 1, and R is 4-pyridyl.

11. N-(2-phenylethyl)-3-indazolecarboxamide.

12. N-(2-methylphenyl)-3-indazolecarboxamide.

13. The process which comprises reacting under anhydrous conditions in an inert solvent diindazolo[2,3-a,2',3'-d]pyrazine-7,14-dione with a compound of the formula $R(CH_2)_nNH_2$ wherein n is a number from 0 to 3; and R is a member selected from the group consisting of phenyl, phenyl substituted by from one to three members of the group consisting of lower-alkyl, lower-alkoxy, lower-alkylmercapto, lower-alkylsulfinyl, lower-alkylsulfonyl, halo, nitro and trihalomethyl and pyridyl.

References Cited

Kochetkov et al.: Zhur. Obshchei Khim. vol. 31, pp. 201–204, January 1961.

HENRY R. JILES, Primary Examiner

A. L. ROTMAN, Assistant Examiner

U.S. Cl. X.R.

260—268, 294.8, 295.5, 296, 310, 999